(12) United States Patent
Sun

(10) Patent No.: US 12,710,943 B2
(45) Date of Patent: Aug. 18, 2026

(54) METHOD FOR MANAGING A RUNTIME SYSTEM FOR A HYBRID COMPUTING ARCHITECTURE, MANAGED RUNTIME SYSTEM, APPARATUS AND COMPUTER PROGRAM

(71) Applicant: Intel Corporation, Santa Clara, CA (US)

(72) Inventor: Mingqiu Sun, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 57 days.

(21) Appl. No.: 17/934,584

(22) Filed: Sep. 23, 2022

(65) Prior Publication Data

US 2023/0195426 A1 Jun. 22, 2023

(51) Int. Cl.

| | |
|---|---|
| ***G06F 8/41*** | (2018.01) |
| ***G06F 8/30*** | (2018.01) |
| ***G06F 9/48*** | (2006.01) |
| ***G06F 9/50*** | (2006.01) |

(52) U.S. Cl.
CPC ................ *G06F 8/447* (2013.01); *G06F 8/31* (2013.01); *G06F 8/451* (2013.01); *G06F 9/4881* (2013.01); *G06F 9/5066* (2013.01)

(58) Field of Classification Search
CPC .......... G06F 9/5066; G06F 8/451; G06F 8/31; G06F 8/447
See application file for complete search history.

(56) References Cited

U.S. PATENT DOCUMENTS

| | | | | |
|---|---|---|---|---|
| 2009/0089792 | A1* | 4/2009 | Johnson | G06F 9/4881 718/108 |
| 2009/0144528 | A1* | 6/2009 | Asai | G06F 9/4484 712/229 |
| 2012/0159477 | A1* | 6/2012 | Veresov | G06F 9/45504 718/1 |
| 2012/0204065 | A1* | 8/2012 | Tsafrir | G06F 9/3851 714/38.1 |
| 2017/0090997 | A1* | 3/2017 | Bohm | G06F 8/70 |

FOREIGN PATENT DOCUMENTS

| | | | | |
|---|---|---|---|---|
| WO | WO-2013101139 A1 * | 7/2013 | | G06F 15/7807 |
| WO | WO-2015143641 A1 * | 10/2015 | | G06F 8/451 |

OTHER PUBLICATIONS

Olivier, Pierre, et al., OS Support for Thread Migration and Distribution in the Fully Heterogeneous Datacenter, HotOS '17: Proceedings of the 16th Workshop on Hot Topics in Operating Systems, May 2017, 6 pages, [retrieved on Nov. 12, 2025], Retrieved from the Internet: <URL:http://dl.acm.org/>.*

* cited by examiner

*Primary Examiner* — Geoffrey R St Leger
(74) *Attorney, Agent, or Firm* — 2SPL Patent Attorneys PartG mbB; Kieran O'Leary

(57) ABSTRACT

Examples relate to a method for managing a runtime system for a hybrid computing architecture, a device, an apparatus and to a corresponding computer program. The apparatus is configured to create a thread pool for each work thread of a computer program, generate native code for at least one of the at least two ISAs for code segments of the computer program, assign native code sequences to a corresponding thread in the thread pool for execution, with the native code sequences comprising the native code of the code segments, and execute the native code sequences.

14 Claims, 3 Drawing Sheets

METHOD FOR MANAGING A RUNTIME SYSTEM FOR A HYBRID COMPUTING ARCHITECTURE, MANAGED RUNTIME SYSTEM, APPARATUS AND COMPUTER PROGRAM

BACKGROUND

A common way to make computer programs is to use a compiler to translate source code, which is written in a higher-level programming language, to machine code. The resulting executable is typically fast. But it is not portable to other architectures, because it is compiled specifically for a dedicated architecture (e.g., a hardware platform). A different approach is to generate instructions for a virtual machine and to use an interpreter on each hardware platform. The interpreter may instantiate the virtual machine environment and execute the instructions. Recently, hybrid architectures such as the big-little on ARM and a combination of performance cores and efficiency cores on some processors by Intel® have emerged. Such hybrid architectures often use different Instruction Set Architectures (ISA) for the different types of cores. For example, a first ISA may be used for the performance cores and a second ISA may be used for the efficiency cores of the processor. For example, on such hybrid platforms, this may lead to features that are supported by the performance cores that remain unused because they are not supported on the efficient cores (or vice versa). This may limit use of the full potential of a CPU core and may limit future innovation on CPU design to a minimal common denominator.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
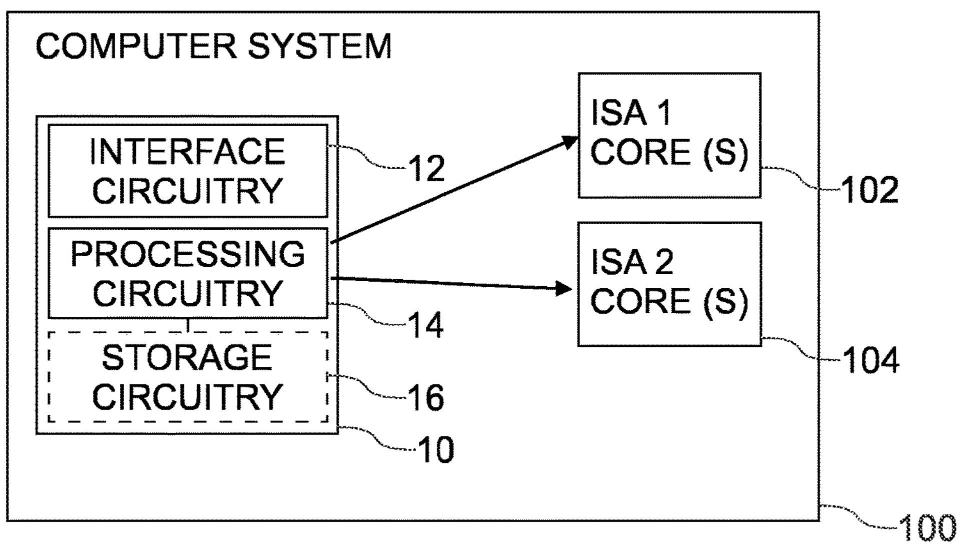
FIGS. 1*a* and 1*b* show a schematic diagram of an example of an apparatus or device for controlling the execution of a computer program by a computer system comprising two or more different cores with at least two different Instructure Set Architectures.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

In the following description, specific details are set forth, but examples of the technologies described herein may be practiced without these specific details. Well-known circuits, structures, and techniques have not been shown in detail to avoid obscuring an understanding of this description. "An example/example," "various examples/examples," "some examples/examples," and the like may include features, structures, or characteristics, but not every example necessarily includes the particular features, structures, or characteristics.

Some examples may have some, all, or none of the features described for other examples. "First," "second," "third," and the like describe a common element and indicate different instances of like elements being referred to. Such adjectives do not imply element item so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform, or resource, even though the instructions contained in the software or firmware are not actively being executed by the system, device, platform, or resource.

The description may use the phrases "in an example/example," "in examples/examples," "in some examples/examples," and/or "in various examples/examples," each of which may refer to one or more of the same or different examples. Furthermore, the terms "comprising," "including," "having," and the like, as used with respect to examples of the present disclosure, are synonymous.

Figure 1B:
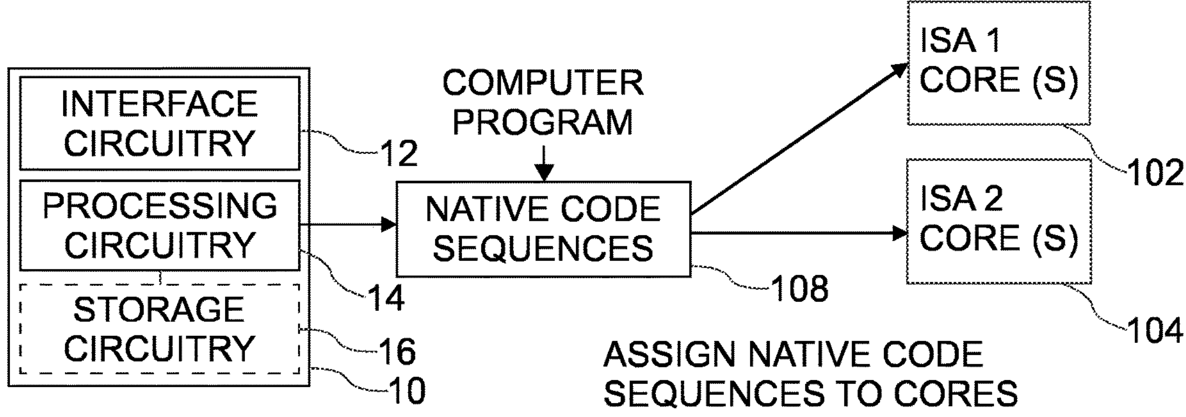

FIGS. 1*a* and 1*b* show a schematic diagram of an example of a managing apparatus 10 or managing device 10 for a hybrid architecture containing cores with at least two different Instruction Set Architectures 102, 104. The managing apparatus 10 comprises circuitry that is configured to provide the functionality of the managing apparatus 10. For example, the managing apparatus 10 of FIG. 1*a* comprises interface circuitry 12, processor 14 (or more generally processing circuitry) and (optional) storage circuitry 16.

For example, the processor 14 may be coupled with the interface circuitry 12 and with the storage circuitry 16. For example, the processor 14 may be configured to provide the functionality of the managing apparatus 10, in conjunction with the interface circuitry 12 (for exchanging information, e.g., with other components of the computer system, such as the two or more cores 102; 104 having the different Instruction Set Architectures) and the storage circuitry (for storing information, such as machine-readable instructions) 16. Likewise, the managing device 10 may comprise means that is/are configured to provide the functionality of the managing device 10. The components of the managing device 10 are defined as component means, which may correspond to, or implemented by, the respective structural components of the managing apparatus 10. For example, the managing device 10 of FIGS. 1*a* and 1*b* comprises means for processing 14, which may correspond to or be implemented by the processor 14, (optional) means for communicating 12, which may correspond to or be implemented by the interface circuitry 12, and (optional) means for storing information 16, which may correspond to or be implemented by the storage circuitry 16. In general, the functionality of the processor 14 or means for processing 14 may be implemented by the processor 14 or means for processing 14 executing machine-readable instructions. Accordingly, any feature ascribed to the processor 14 or means for processing 14 may be defined by one or more instructions of a plurality of machine-readable instructions. Machine-readable instructions may be a form of a computer program that may direct a computer's processor to perform specific operations. The managing apparatus 10 or managing device 10 may comprise the machine-readable instructions, e.g., within the storage circuitry 16 or means for storing information 16.

The processor 14 or means for processing 14 is configured to create a thread pool for each work thread of a computer program. The processor 14 or means for processing 14 is configured to generate native code for at least one of the at least two ISAs for code segments of the computer program. The processor 14 or means for processing 14 is configured to assign native code sequences to a corresponding thread in the thread pool for execution, with the native code sequences comprising the native code of the code segments. The processor 14 or means for processing 14 is configured to execute the native code sequences. This makes it possible to process code for hybrid architectures, using the full potential of hybrid cores.

FIG. 1*b* shows a block diagram of another example of a managing apparatus 10 or managing device 10, illustrating the creation of native code sequences from the computer program and the assignment of native code sequences dedicated to certain ISAs to corresponding cores.

Figure 1C:
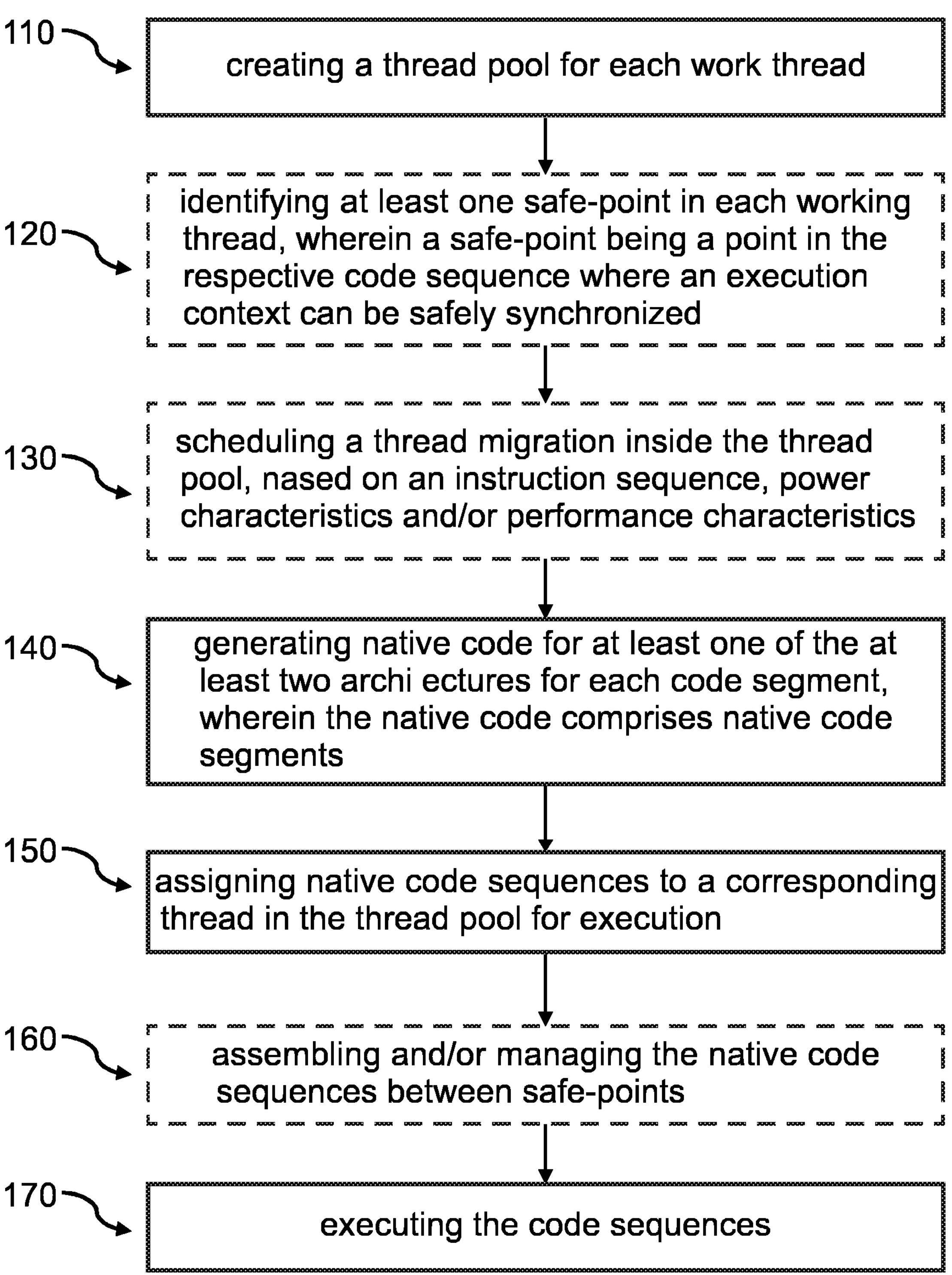
FIG. 1*c* shows a flow chart of an example of a method for managing a runtime system for a hybrid computing architecture.

FIG. 1*c* shows a flow chart of an example of a corresponding method for managing a runtime system for a hybrid computing architecture. The method comprises creating 110 a thread pool for each work thread of a computer program. The method comprises generating 140 native code for at least one of the at least two ISAs for code segments of the computer program. The method comprises assigning 150 native code sequences to a corresponding thread in the thread pool for execution, with the native code sequences comprising the native code of the code segments. The method comprises executing 170 the code sequences. For example, the managing method may be performed by a computer system, e.g., by a managing apparatus or device of the computer system. Dotted blocks in all Figures indicate optional features, like optional instructions, devices, units.

In the following, the functionality of the managing apparatus 10, the managing device 10, the managing method and of a corresponding computer program is illustrated with respect to the managing apparatus 10. Features introduced in connection with the managing apparatus 10 may likewise be included in the corresponding managing device 10, managing method and computer program.

Various examples of the present disclosure are based on the finding, that either it is not possible to exploit the benefit of hybrid systems comprising cores with different capabilities (e.g., different Instruction Set Architectures (ISA), i.e., the simultaneous use of different types of cores, or it is not possible to exploit advanced features that are not available in all hybrid cores. These issues may be overcome by proposing a scheme to use managed runtime systems such as a Virtual Machine, Bytecode, WebAssembly (WASM), for code generation targeting different Instruction Set Architectures (ISAs) and scheduling them to the appropriate cores 102; 104. The generated code targeting different Instruction Set Architectures (ISA), may be native code for each of the respective targeted Instruction Set Architecture (ISA). With use of a thread pool and assigning each working thread to its corresponding thread pool, scheduling the generated native code to the appropriate cores with different ISAs may become possible. In such a scenario the proposed concept allows the use of the full potential of each core(type).

In the proposed concept, as introduced above, the processor is configured to create a thread pool 106 (not shown in FIGS. 1*a* and 1*b*) for each work thread 109 (not shown in FIGS. 1*a* and 1*b*) of the computer program. In computer programs, a thread may be an execution model for executing the instructions of a computer program. It may allow a program to control multiple different flows of work that overlap in time. Each flow of work may be referred to as a thread (such as the work thread(s)), and creation and control over these flows may be achieved by making calls to a Threads Application Programming Interface (API). A work thread 109 or worker thread may be a generic term for a thread which may perform some task independent of the primary or main thread of the computer program. Depending on usage, the work thread 109 may be any thread other than the primary or main thread, or it may be a thread that performs a defined and finite data processing task, rather than a continuous operation which may last a lifetime of an application. A thread pool 106 may be a software design pattern for achieving concurrency of execution in a computer program. A thread pool 106 may maintain multiple threads waiting for tasks to be allocated for concurrent execution by a respective supervising program, e.g., the runtime environment. By maintaining a pool of threads, the model may increase performance and may avoid latency in execution due to frequent creation and destruction of threads for short-lived tasks. The number of available threads may be tuned to the computing resources available to the program, such as a parallel task queue after completion of execution. Thus, a thread pool 106 may be a collection of threads of a work thread 109, which may be assigned to perform tasks. Such a thread pool 106 may manage a set of threads that may perform a task on request. In many cases, the threads do not terminate after completing their respective task. When one of the threads completes a task, the thread may become idle, ready to be dispatched to another task.

The managing apparatus for a hybrid architecture contains cores with at least two different Instruction Set Architectures (ISAs). generate (e.g., translate, compile) 140 native code 108*a*; 108*b* for at least one of the at least two architectures 102, 104 for code segments of the computer program. For example, in processors with performance cores and efficiency cores, the performance core may have (i.e., support) a first ISA, and the efficient (or efficiency) cores may have (i.e., supported) a second ISA. For example, the performance cores may support an ISA that supports more complex data processing instructions (e.g., vector processing instructions), while the efficient cores may support a less-capable ISA, with the benefit of operating more efficiently.

For example, the computer program may be subdivided into code segments, e.g., code segments that each contain a portion of the computer program. For example, a code segment may have different granularities. For example, the code segments may correspond to procedures or functions of the computer program, or to sub-portions of such procedures or functions, such as loops or single instructions. For example, as the native code is generated from the code segments of the computer programs, the native code 108*a*; 108*b* comprises native code segments. Native code 108*a*; 108*b*, which may be machine code, may be a program that is written in machine language. For example, the native code 108*a*; 108*b* may be code that is tailored to an ISA of a processor or processor core. For example, the native code may be built upon the instructions exposed by the ISA of the respective processor or core the native code is written for, for example. For example, the native code may be interpreted directly by the respective processor or core the native code is written for, without requiring additional translation. Thus, the native code 108*a*; 108*b* may be specific for a certain Instruction Set Architecture (ISA).

In a straightforward implementation, native code sequences may be generated for (all of) the ISAs supported by the cores and based on each code segment. However, in many cases, it may be beneficial to target a specific ISA, and thus a subset of core(s), when generating a native code sequence. For example, some native code sequences may benefit from the availability of vector processing instructions in one of the ISAs, which may be absent in another ISA. In this case, the native code sequence may be generated for the ISA supporting the vector processing instructions. On the other hand, some native code sequences may not include complex processing tasks, but non-time-critical regular maintenance tasks, which may be performed by a less powerful efficient (or efficiency) core at a reduced power consumption. In this case, the native code sequence(s) may be generated for the ISA of the efficient (or efficiency) core.

The processing circuitry 14 or means for processing 14 or processor 14 is configured to assign native code sequences 108 to a corresponding thread in the thread pool 106 for execution. For example, the native code sequences comprise the native code of the code segments, i.e., the native code that is generated from the code segments of the computer program. A native code sequence 108 may comprise native code segments in the order to execute. For example, a native codes sequence may be generated (e.g., compiled, translated) for a certain ISA. Therefore, the corresponding thread is executed on a core supporting this ISA. In other words, the native code sequence may be assigned to a corresponding thread based on the ISA the native code sequence is generated for and the ISA supported by a core executing the thread. Accordingly, the native code will be assigned to a thread of the thread pool for this ISA. The processing circuitry 14 or means for processing 14 or processor 14 is configured to execute the machine-readable instructions to execute the code sequences. The processor thus instructs the respective threads within the thread pool to execute one or more specific code sequences.

In the following, the managing apparatus 10 shown in connection with FIG. 1*a* and FIG. 1*b* will be explained in more detail by introducing further aspects of the proposed concept.

One aspect of the managing apparatus 10 relates to the thread pool 106. Therein, each thread pool 106 comprises a thread for each Instruction Set Architecture 102; 104. Thus, a thread pool 106 may be created for each software thread. This may introduce an extra level between a thread scheduler and the hardware cores. Each thread pool 106 may comprise at least one thread dedicated to a certain Instruction Set Architecture (ISA) 102; 104 core type. For example, if two different Instruction Set Architecture (ISA) 102; 104 core types exist, each thread pool 106 comprises at least two threads, the first thread dedicated to the first Instruction Set Architecture (ISA) 102 and the second thread dedicated to the second Instruction Set Architecture (ISA) 104. Thus, the thread pool 106 may be extended to include N threads for N-type hybrid systems, respectively for N different Instruction Set Architecture (ISA) 102; 104 core types. This may allow for an even better usage of the different core types a computer system may provide.

In the proposed concept, the processor of the managing apparatus 10 may moreover be configured to schedule 130 a thread migration inside the thread pool 106, based on an instruction sequence, power characteristics and/or performance characteristics. Accordingly, as further shown in FIG. 1*c*, the managing method may comprise scheduling 130 a thread migration inside the thread pool 106, based on an instruction sequence, power characteristics and/or performance characteristics. Thread migration may be the movement of a thread from one core's run queue to another core's run queue. This may be achieved by means of the previously mentioned criteria, for example, depending on current needs or optimizations to be achieved. A thread migration may be a specialized form of thread management whereby threads are moved from one computing environment to another. On multicore machines, like computers with multiple cores 102; 104 on one processor or multiple processors, thread migration may be performed as a part of thread scheduling. In the present context, when thread migration is performed, the native code sequences being used may be changed to a native code sequence that is generated for the ISA being supported by the core that the thread is to be migrated to. This may allow for an improved utilization of the different existing cores of the same core type.

As a further aspect of the managing apparatus 10, the processor of the managing apparatus 10 may moreover be configured to identify 120 at least one safe-point in each working thread 109, wherein a safe-point being a point in the respective code sequence where an execution context can be safely synchronized. Accordingly, as further shown in FIG. 1*c*, the managing method may comprise identifying 120 at least one safe-point in each working thread. Safe-points may be points in the code sequence where the execution context can be safely synchronized to a globally visible and architecturally independent execution context that is managed by the managing apparatus 10. Not every point in the code sequence may be a safe-point. An example is during execution of Single Instruction/Multiple Data (SIMD) instructions where the SIMD register states are not captured in the execution context. This may lead to a more robust processing of the instructions.

Safe-points can moreover be used to find out how long a code sequence can or must be or at which point it can be interrupted. At the safe-points, a thread migration may be performed. Thus, execution may be interrupted in one thread of the thread pool and continued in another thread of the thread pool, as now with the safe-point the point is known, when data can be synchronized. This may lead to an even more improved processing of the instructions.

As a further aspect of the managing apparatus 10, identifying the at least one safe-point in each working thread 109 is based on an analysis of an architecture independent virtual machine and the corresponding generated native code 108*a*; 108*b* for the corresponding Instruction Set Architecture 102; 104. As the analyzed virtual machine is architecture independent, the program code of the virtual machine is also architecture independent. The native code which is created for cores with a dedicated ISA, is architecture-dependent, as it is generated for the instructions supported by the core. An analysis of the architecture independent virtual machine may aid for a better identification of usable safe-points in the working threads. A better identification of usable safe-points may lead to an even more robust processing of the instructions.

As a further aspect of the managing apparatus 10, the processor 14 of the managing apparatus 10 may moreover be configured to assemble (e.g., combine or put together code segments into a code sequence) and/or manage 160 the native code sequences (e.g., keep the native code sequences available for execution on the different ISAs and/or generate new native code sequences on the fly as required) between safe-points. Accordingly, as further shown in FIG. 1*c*, the managing method may comprise assembling and/or managing 160 the native code sequences between safe-points. This may allow for a more robust processing within the managing apparatus 10. The managing apparatus may analyze the code sequences and target them to dedicated ISAs. And depending on the instructions of the dedicated ISAs for the code sequences, the native code may be assembled. This may lead to an even more robust processing of the instructions.

As a further aspect of the managing apparatus 10, the processing circuitry may be configured to use code generation instructions for generating 140 the native code 108*a*; 108*b*.

As a further aspect of the managing apparatus 10, the processing circuitry may be configured to perform execution context management. The execution context may determine which code or code section may have access to the code's parameters, functions and the like. Execution context may refer to an environment in which the respective thread of the computer program is executed. This may lead to a larger number of execution contexts. Thus, execution context management may provide management of all execution context, defining which code shall be processed next and/or in which order. This may lead to a faster processing of the code to be processed. Moreover, by performing execution context management, it may be ensured, that the right data is used for performing the threads within the thread pool. This may be important, when data is used for performing the threads of thread pools for different ISAs.

As a further aspect of the managing apparatus 10, the processing circuitry may be configured to manage execution contexts, the execution contexts each comprising an architecture-independent snapshot of an execution state of a respective work thread 109. For example, the architecture-independent snapshot takes place inside the virtual machine. This may ensure, that the correct data is always used, regardless of which thread is currently running within a thread pool. This may lead to an even more robust processing of the instructions.

As a further aspect of the managing apparatus 10, the native code sequences are targeted for a specific architecture, i.e., for a specific ISA of the at least two ISAs. In other words, the architecture may be an Instruction Standard Architecture 102; 104. This may allow for a more optimized utilization of the different existing core types.

As a further aspect of the managing apparatus 10, the native code sequences are targeted to a corresponding thread in the thread pool 106 for execution by a thread scheduler of the managing apparatus 10. This may lead to a more optimized utilization of the different existing cores. This may lead to a more optimized utilization of the different existing core types.

The present disclosure relates to a concept for controlling the execution of a computer program in a virtual machine or as bytecode by a computer system 100 comprising different cores with different Instruction Set Architectures (ISA). In a multi-core computer system 100, some cores may support the same ISA, while other cores may support a different second ISA. Also, other cores may support another different third ISA and so forth.

In the proposed concept, the computer program may be represented by bytecode or by an intermediate representation, i.e., by non-native code. A virtual machine may be used to execute the bytecode of the computer program, by performing the aforementioned generation of the native code, assigning the code sequences to the corresponding thread in the thread pool, and finally executing the native code sequences. In the present case, the native code is generated for different ISAs. For example, Hybrid big-little CPU systems may be used with WebAssembly (Wasm), which is a binary instruction format (i.e., a bytecode) for a stackbased virtual machine (i.e., the virtual machine). Wasm is designed as a portable compilation target for programming languages, enabling deployment on the web for client and server applications.

There may exist different objectives for the design of processors (for example, simple design or as many instructions per clock cycle as possible). Accordingly, processors may be designed with different architectures. In recent times, different architectures and thus also different ISAs may be used on the same processor through different processor codes. This may lead to different processor cores 102; 104 within a processor, which may be optimized for different tasks. For example, one such processor may be optimized as a performance core, while another may be optimized as an efficient core. A performance core may be a processor core, that is designed to provide a higher performance at a lower energy efficiency. An efficient (or efficiency) core may be a processor core that is designed to provide a low electrical energy consumption, thus higher energy efficiency, at a lower performance. A performance core may have a different Instruction Set Architecture (ISA) than an efficient core.

The interface circuitry 12 or means for communicating 12 may correspond to one or more inputs and/or outputs for receiving and/or transmitting information, which may be in digital (bit) values according to a specified code, within a module, between modules or between modules of different entities. For example, the interface circuitry 12 or means for communicating 12 may comprise circuitry configured to receive and/or transmit information.

For example, the processing circuitry 14 or means for processing 14 may be implemented using one or more processing units, one or more processing devices, any means for processing, such as a processor, a computer or a programmable hardware component being operable with accordingly adapted software. In other words, the described function of the processing circuitry 14 or means for processing may as well be implemented in software, which is then executed on one or more programmable hardware components. Such hardware components may comprise a general-purpose processor, a Digital Signal Processor (DSP), a micro-controller, etc.

For example, the storage circuitry 16 or means for storing information 16 may comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

For example, the computer system 100 may be a workstation computer system (e.g., a workstation computer system being used for scientific computation) or a server computer system, i.e., a computer system being used to serve functionality, such as the computer program, to one or more client computers.

More details and aspects of the managing apparatus 10, managing device 10, managing method, computer program and (computer) system 100 are mentioned in connection with the proposed concept or one or more examples described above or below (e.g., FIG. 2). The managing apparatus 10, managing device 10, managing method, computer program and (computer) system 100 may comprise one or more additional optional features corresponding to one or more aspects of the proposed concept, or one or more examples described above or below.

Figure 2:
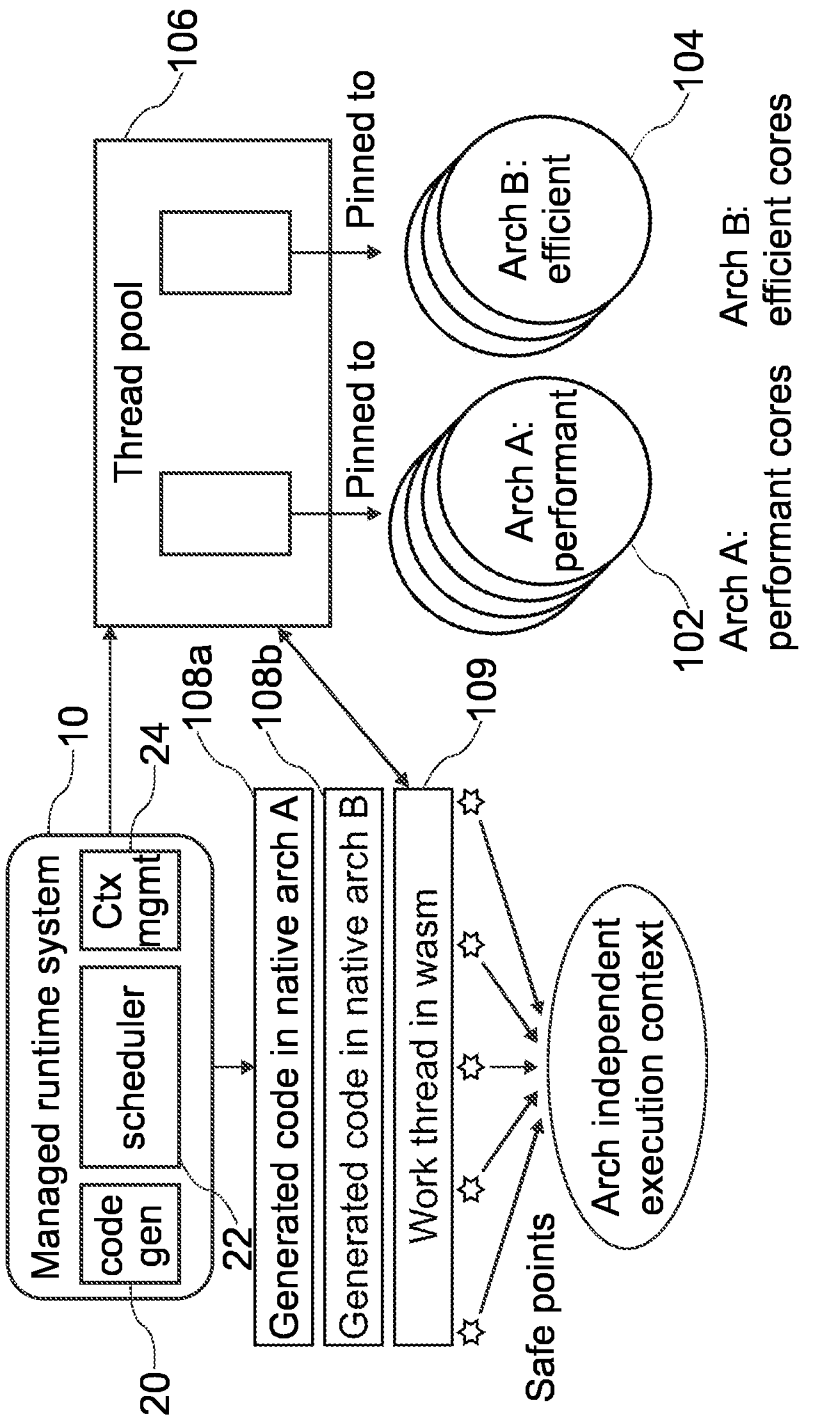
FIG. 2 shows a schematic diagram of an example of a hybrid computing architecture of performance and efficient cores using the proposed concept of a Managed Runtime System (MRS).

FIG. 2 shows a schematic diagram of an example of a hybrid computing architecture of performance and efficient cores using the proposed concept of a Managed Runtime System (MRS).

For example, for each WASM workload thread, a Managed Runtime System (MRS) may generate 110 a thread pool 106 of N threads, each of which is dedicated to a particular core 102; 104 type. For example, when two different types of cores are used, two work threads may be used, with each of the work threads pinned to one of the cores. As a result, for each WASM workload thread, a thread pool with two work threads may be created. The managing apparatus 10 may for example schedule 130 thread migration inside the thread pool 106, based on properties such as instruction sequences, power and performance characteristics.

Thread scheduling may decide which thread to run or execute and which thread to wait. Thread scheduling for example may use a threads library, which may provide several facilities to handle and control the scheduling of threads. Thread scheduling may provide facilities to control the scheduling of threads during synchronization operations. Each thread may have its own set of scheduling parameters. These parameters may be set using a thread attributes object before the thread may be created. The parameters may also be dynamically set during the thread's execution. Because the scheduler may handle all threads system wide, the scheduling parameters of a thread may interact with those of all other threads in the process and in the other processes, controlling the scheduling of a thread may be a complex task.

Now benefits of both worlds may be achieved: the ability to mix cores 102; 104 with different ISAs in a hybrid architecture, and the ability to use unique instructions that are available to a specific type of cores 102; 104 only. Moreover, there is no need to change the application code.

As a result, the managing apparatus 10 may generate multiple copies of a code targeting different architecture. Moreover, the proposed concept may also have an execution pattern and a thread migration as for example, code that may contain different instructions running on different cores.

The MRS may, for example, be implemented as a managing apparatus 10 or managing device 10. For example, the MRS may be an implementation of a managing apparatus 10 or managing device 10. For example, the MRS may be a part of a managing apparatus 10 or managing device 10. For example, the managing apparatus 10 or managing device may be a part of the MRS. A managed runtime system (MRT), such as a Virtual Machine, a Bytecode or a WebAssembly runtime, may contain a code generation unit 20, a thread scheduler 22, and an execution context management unit 24 for the proposed concept. An execution context may contain an architecture-independent snapshot of the execution state of a work thread 109.

The MRT or managing apparatus 10 or managing device 10 may create 110 a thread pool 106 for each work thread 109. Each thread pool 106 may have two threads inside it in the diagram, with one pinned to architecture A (Arch A) core type, and the other to architecture B (Arch B) core type through an OS system call. The thread pool 106 can be extended to include N threads for N-type hybrid systems.

The thread pool 106 may be an MRT structure that may be scheduled by a regular OS to run on any arbitrary hardware core combination. The structure should be guaranteed to have access to each core type.

The MRT or managing apparatus 10 or managing device 10 may then identify 120 safe-points in the work thread 109, upon analysis of the architecture independent Wasm or other bytecode formats, and their corresponding generated code for different architectures. Safe-points may be points in the Wasm code sequence where the execution context can be safely synchronized to a globally visible and architecturally independent execution context that is managed by the MRT. Not every point in the Wasm code sequence may be a safe-point.

The MRT code generation unit 20 may generate architecture native code. Code sequences may be assembled and managed between safe-points. For example, MRT may generate code for all architectures in the hybrid systems, or, for example, MRT may generate code for a selected subset based on scheduling needs. Code may be generated for at least one architecture for each code segment. For example, as an optimization strategy, MRT may also merge multiple segments of the code together.

The MRT scheduler may then assign 150 native code sequences to the corresponding thread in the thread pool 106 for execution. For example, the codes sequences may be targeted for a specific architecture. Upon completion of the execution of the code sequence, control may return to the MRT scheduler for scheduling the next code sequence.

This allows execution of completely incompatible instruction sets in a single hybrid system, assuming availability of a shared memory system for storing the architecture independent execution context structure. The MRT runtime system may be run from any architecture.

On some hybrid architecture a special case may arise, where only a small subset of instructions is different. Native application code sequences utilizing for example AVX512 may be generated and executed on the performance core, thus removing the ISA conformity requirement.

The proposed managing apparatus 10 or managing device 10, which may be a WebAssembly runtime system, may contain a code generation unit 20, a thread scheduler 22, and an execution context management unit 24. An execution context may contain an architecture-independent snapshot of the execution state of a work thread 109.

In the following, some examples of the proposed concept are given.

An example (e.g., example 1) relates to a managing apparatus for a hybrid architecture containing cores with at least two different Instruction Set Architectures (ISAs). The managing apparatus comprises interface circuitry and processing circuitry configured to create a thread pool for each work thread of a computer program. The processing circuitry is configured to generate native code for at least one of the at least two ISAs for code segments of the computer program. The processing circuitry is configured to assign native code sequences to a corresponding thread in the thread pool for execution, with the native code sequences comprising the native code of the code segments. The processing circuitry is configured to execute the native code sequences.

Another example (e.g., example 2) relates to a previous example (e.g., example 1) or to any other example, further comprising that each thread pool comprises a thread for each Instruction Set Architecture.

Another example (e.g., example 3) relates to a previous example (e.g., one of the examples 1 or 2) or to any other example, further comprising that the processing circuitry is configured to schedule a thread migration inside the thread pool, based on at least one of an instruction sequence, power characteristics and performance characteristics.

Another example (e.g., example 4) relates to a previous example (e.g., one of the examples 1 to 3) or to any other example, further comprising that the processing circuitry is configured to identify at least one safe-point in each working thread, wherein a safe-point is a point in the respective code sequence where an execution context can be safely synchronized.

Another example (e.g., example 5) relates to a previous example (e.g., example 4) or to any other example, further comprising that identifying at least one safe-point in each working thread is based on an analysis of an architecture independent virtual machine and the corresponding generated native code for the respective ISA.

Another example (e.g., example 6) relates to a previous example (e.g., one of the examples 4 or 5) or to any other example, further comprising that the processing circuitry is configured to assemble and/or manage the native code sequences between safe-points.

Another example (e.g., example 7) relates to a previous example (e.g., one of the examples 1 to 6) or to any other example, further comprising that the processing circuitry is configured to execute code generation instructions for generating the native code.

Another example (e.g., example 8) relates to a previous example (e.g., one of the examples 1 to 7) or to any other example, further comprising that the native code sequences are targeted for a specific ISA.

Another example (e.g., example 9) relates to a previous example (e.g., one of the examples 1 to 8) or to any other example, further comprising that the native code sequences are targeted for a corresponding thread in the thread pool for execution by a thread scheduler of the managing apparatus.

Another example (e.g., example 10) relates to a previous example (e.g., one of the examples 1 to 9) or to any other example, further comprising that the processing circuitry is configured to perform execution context management.

Another example (e.g., example 11) relates to a previous example (e.g., one of the examples 1 to 10) or to any other example, further comprising that the processing circuitry is configured to manage execution contexts, the execution contexts each comprising an architecture-independent snapshot of an execution state of a respective work thread.

An example (e.g., example 12) relates to a managing apparatus for a hybrid architecture containing cores with at least two different Instruction Set Architectures (ISAs). The managing apparatus comprises interface circuitry, machine-readable instructions and a processor configured to execute the machine-readable instructions to create a thread pool for each work thread of a computer program. The machine-readable instructions comprise instructions to generate native code for at least one of the at least two ISAs for code segments of the computer program. The machine-readable instructions comprise instructions to assign native code sequences to a corresponding thread in the thread pool for execution, with the native code sequences comprising the native code of the code segments. The machine-readable instructions comprise instructions to execute the native code sequences.

An example (e.g., example 13) relates to a managing device for a hybrid architecture containing cores with at least two different Instruction Set Architectures (ISAs), the device comprising means for communicating and means for processing for creating a thread pool for each work thread of a computer program, generating native code for at least one of the at least two ISAs for code segments of the computer program, assigning native code sequences to a corresponding thread in the thread pool for execution, and executing the code sequences.

An example (e.g., example 14) relates to a managing method for managing a runtime system for a hybrid computing architecture containing cores with at least two different Instruction Set Architectures (ISAs), the method comprising creating a thread pool for each work thread of a computer program, generating native code for at least one of the at least two ISAs for code segments of the computer program, assigning native code sequences to a corresponding thread in the thread pool for execution, with the native code sequences comprising the native code of the code segments, and executing the code sequences.

Another example (e.g., example 15) relates to a non-transitory machine-readable storage medium including program code, when executed, to cause a machine to perform the method of example 14.

Another example (e.g., example 16) relates to a computer program having a program code for performing the method one of the examples 14 or 15 when the computer program is executed on a computer, a processor, or a programmable hardware component.

An example (e.g., example 18) relates to a machine-readable storage including machine readable instructions, when executed, to implement a method or realize an apparatus as in any example shown herein.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

As used herein, the term "module" refers to logic that may be implemented in a hardware component or device, software or firmware running on a processing unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processing units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processing units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

The disclosed methods, apparatuses, and systems are not to be construed as limiting in any way. Instead, the present disclosure is directed toward all novel and nonobvious features and aspects of the various disclosed examples, alone and in various combinations and subcombinations with one another. The disclosed methods, apparatuses, and systems are not limited to any specific aspect or feature or combination thereof, nor do the disclosed examples require that any one or more specific advantages be present, or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A managing apparatus for a hybrid architecture containing cores with at least two different Instruction Set Architectures (ISAs), the managing apparatus comprising interface circuitry, machine-readable instructions and a processor configured to execute the machine-readable instructions to:

create a thread pool for each work thread of a computer program, wherein each thread pool comprises a thread for each Instruction Set Architecture;

generate native code for at least one of the at least two ISAs for code segments of the computer program;

assign native code sequences to a corresponding thread in the thread pool for execution, with the native code sequences comprising the native code of the code segments; and execute the native code sequences.

2. The managing apparatus of claim 1, wherein the machine-readable instructions comprise instructions to:

schedule a thread migration inside the thread pool, based on at least one of an instruction sequence, power characteristics and performance characteristics.

3. The managing apparatus of claim 1, wherein the machine-readable instructions comprise instructions to:

identify at least one safe-point in each work thread, wherein a safe-point is a point in a respective code sequence where an execution context can be safely synchronized.

4. The managing apparatus of claim 3, wherein identifying at least one safe-point in each work thread is based on an analysis of an architecture independent virtual machine and the corresponding generated native code for the respective ISA.

5. The managing apparatus of claim 3, wherein the machine-readable instructions comprise instructions to:

assemble and/or manage the native code sequences between safe-points.

6. The managing apparatus of claim 1, wherein the machine-readable instructions comprise code generation instructions for generating the native code.

7. The managing apparatus of claim 1, wherein the native code sequences are targeted for a specific ISA.

8. The managing apparatus of claim 1, wherein the native code sequences are targeted for a corresponding thread in the thread pool for execution by a thread scheduler of the managing apparatus.

9. The managing apparatus of claim 1, wherein the machine-readable instructions comprise instructions to perform execution context management.

10. The managing apparatus of claim 1, wherein the machine-readable instructions comprise instructions to manage execution contexts, the execution contexts each comprising an architecture-independent snapshot of an execution state of a respective work thread.

11. A managing apparatus for a hybrid architecture containing cores with at least two different Instruction Set Architectures (ISAs), the managing apparatus comprising interface circuitry and processing circuitry configured to:

create a thread pool for each work thread of a computer program, wherein each thread pool comprises a thread for each Instruction Set Architecture;

generate native code for at least one of the at least two ISAs for code segments of the computer program;

assign native code sequences to a corresponding thread in the thread pool for execution, with the native code sequences comprising the native code of the code segments; and execute the native code sequences.

12. A managing device for a hybrid architecture containing cores with at least two different Instruction Set Architectures (ISAs), the managing device comprising means for communicating and means for processing for:

creating a thread pool for each work thread of a computer program, wherein each thread pool comprises a thread for each Instruction Set Architecture;

generating native code for at least one of the at least two ISAs for code segments of the computer program;

assigning native code sequences to a corresponding thread in the thread pool for execution; and executing the code sequences.

13. A managing method for managing a runtime system for a hybrid computing architecture containing cores with at least two different Instruction Set Architectures (ISAs), the method comprising:

creating a thread pool for each work thread of a computer program, wherein each thread pool comprises a thread for each Instruction Set Architecture;

generating native code for at least one of the at least two ISAs for code segments of the computer program;

assigning native code sequences to a corresponding thread in the thread pool for execution, with the native code sequences comprising the native code of the code segments; and executing the code sequences.

14. A non-transitory machine-readable storage medium including program code, when executed, to cause a machine to perform the method of claim 13.

* * * * *